Sept. 30, 1969    C. WEBER    3,470,286
MANUFACTURE OF ELONGATED RESINOUS STRIPS
Filed Aug. 8, 1966

Christine Weber
INVENTOR

BY Karl F. Ross
Attorney

United States Patent Office 3,470,286
Patented Sept. 30, 1969

3,470,286
MANUFACTURE OF ELONGATED RESINOUS STRIPS
Christine Weber, Leopoldstrasse 38, Innsbruck, Austria
Filed Aug. 8, 1966, Ser. No. 571,036
Claims priority, application Austria, Aug. 9, 1965,
A 7,332/65
Int. Cl. D01d 5/20; B29d 7/08
U.S. Cl. 264—167                                    6 Claims

ABSTRACT OF THE DISCLOSURE

An elongated body of varying cross-section, such as a ski runner, is made by continuous extrusion of a mass of thermoplastic material into the space between a heated conveyor band and a co-operating cooled roller synchronized therewith whose radial spacing from the band is periodically altered or which is formed with a peripheral groove of nonuniform depth and/or width to define with the band a gap of gradually changing profile; several plastic strips so produced may be stacked to form the desired body. Variation of the roller and band speed in dependence upon the profile may help maintain a substantially constant extrusion rate.

---

The present invention relates to the manufacture of elongated strips of resinous thermoplastic material of considerable length, e.g., several meters, whose cross-section varies in at least one transverse dimension over the length of the strip.

Typical of elongated members having such a configuration are the bodies of skis which must be relatively thick in the middle while tapering toward their ends, with maintenance of substantially a constant width throughout. Girder flanges and other structural elements may also have shapes varying in width and/or height over a considerable length.

The manufacture of such bodies from thermoplastic materials has not been practical heretofore in the case of lengthy articles. Attempts to form such elongated bodies by injection molding, for example, failed by reason of the uncontrollable internal stresses due to the large temperature differences.

The present invention has for its object the provision of a method of and means for making such elongated articles by extrusion, thus by a process which is independent of the length of the article.

In accordance with an aspect of this invention, an article of this description is made by the extrusion of a resinous material in the conventional manner, i.e., as a deformable coherent mass, into a gap which is formed between a forwardly moving supporting band and a coacting roller, with variation of the gap during the extrusion process. In order to preserve the continuity of the extruded body in spite of the resulting variations in width and/or thickness, the band is maintained at a relatively high temperature, near the softening point of the plastic material, in the vicinity of the extruder whereas the coacting roller is kept relatively cool. This causes the extruded body to adhere to the moving band which therefore imparts its own characteristics to one surface of the body, generally a substantially flat surface. Subsequently, the extruded mass is allowed to cool whereupon the body may be readily stripped off the band; this stripping may be preceded by an annealing treatment designed to eliminate residual internal stresses within the plastic material. The adherence of the plastic body to the supporting band may be further enhanced, if necessary, by suitably treating (e.g., roughening) the contact surface of the band.

The shape of the gap may be changed in a variety of ways. In a simple case, in which only the thickness of the extruded body (measured perpendicularly to its supporting surface) is to undergo significant variations the coacting roller may be moved transversely with reference to the band for this purpose. It is also possible, however, to provide this roller with a nonuniform periphery, e.g., a peripheral recess varying in width or depth over its circumference.

If the change in cross-sectional area at the gap is considerable, it may be desirable to make compensatory adjustments in either the extrusion speed or the band speed, preferably the latter so as not to produce temperature changes due to variations in the extrusion rate. With proper correlation of band speed and gap size, the rate of passage of the extruded mass through the gap and therefore the density of the product may be maintained substantially constant.

Although the process according to this invention is not limited to a particular resinous material, there are instances when specific requirements as to strength, resiliency, flexibility etc. must be satisfied. In the case of a ski, for example, these requirements are quite severe. A particularly suitable resinous material for such uses is polymerized acrylonitrylbutadienestyrene (hereinafter referred to as ABS) which yields smooth-surfaced strips free from internal stresses. Polycarbonates are also satisfactory. If desired, the extruded material may have embedded therein a set of filamentary reinforcements, such as glass fibers, as is well known per se.

The invention will be described in greater detail, reference being made to the appended drawing in which.

Figure 1:
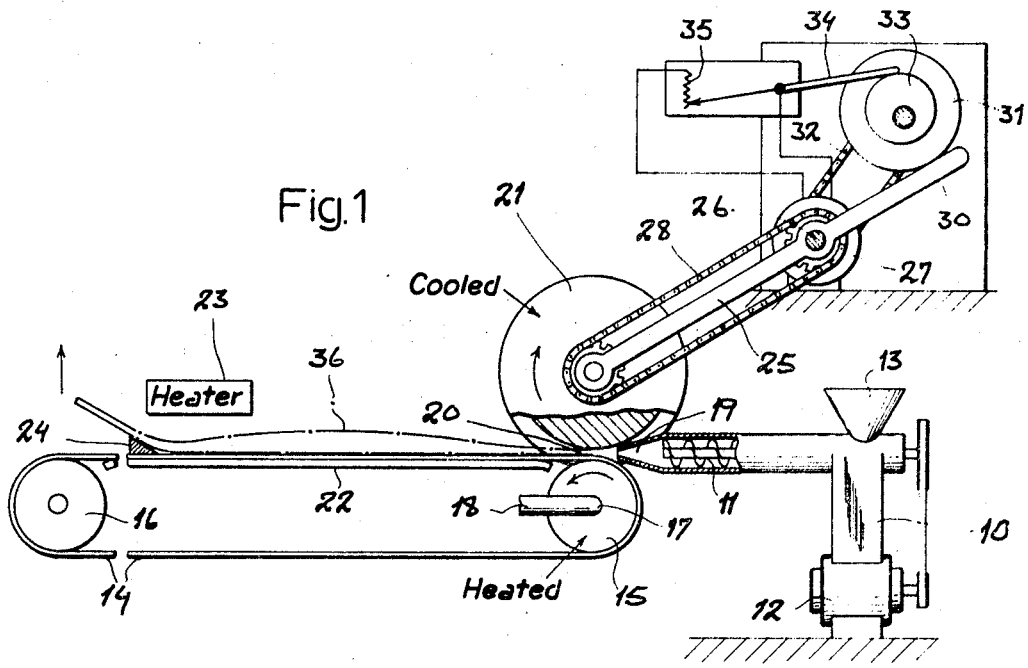
FIG. 1 is a diagrammatic view of an extrusion plant adapted to carry out the present process.

In FIG. 1 there is shown a conventional extruder 10 with a worm 11 continuously driven from a motor 12; a hopper 13 serves for the introduction of thermoplastic material in granular form.

An endless band 14 of good thermal conductivity, e.g., of steel, is wound around a pair of rollers 15, 16. Roller 15 is heated, as by the passage of a hot fluid through its hollow shaft 17 via a conduit system 18, to an elevated temperature near the softening point of the material issuing from the nozzle 19 of extruder 10. This nozzle is trained at a gap 20 formed between the upper surface of band 14 and the circumference of a peripherally recessed coacting roller 21. A fixed support for the upper run of band 14 is shown at 22. Also shown is a heater 23, defining an annealing zone remote from gap 20, and a stripper 24.

Roller 21 is journaled on a swingable arm 25 whose fulcrum 26 is coaxial with the shaft of a motor 27 driving the roller 21 through a chain transmission 28. A similar transmission 29 (FIG. 2), but with mutually opposite direction of movement as indicated by the arrows, may interconnect the rollers 21 and 15 for synchronous rotation.

Arm 25 has an extension 30 in contact with a cam 31 also driven, via a chain 32, by motor 27; it will be understood that both chain drives 28 and 32 may be connected with the motor via suitable reduction gears. A second cam 33, rigid with shaft 31, has a follower 34 which operates a speed controller for motor 27, here shown as a variable resistor 35 connected, for example, in series with the field winding of the motor (assumed to be of the direct-current type).

The cams 31 and 33 are so designed that arm 25 oscillates about its fulcrum 26 to vary the height of gap 20 while resistor 35 controls the speed of motor 27 in a sense to reduce the peripheral speed of roller 21, and therefore the linear speed of band 14, with increasing gap height. The resulting elongated body 36, illustrated in dot-dash lines, adheres to the band 14 until it is stripped off at 24 after cooling and, if desired, annealing by means of heater 23. This body will still be sufficiently deformably to permit its shaping into, for example, a slightly curved foil several of which may be laminated to form a ski runner. Such a body could also be bent into U-shape to constitute, for example, a supporting yoke for a seat of the type used in ski lifts. Moreover, the configuration of the body 36 can be repeated in a continuously extruded strip to be subsequently separated into sections.

It will be apparent that the controller 35 could also be used to regulate the speed of motor 12, and therefore the extrusion rate at the nozzzle 19, though for the reasons stated above it is preferred to vary the band speed with maintenance of a substantially constant density.

Roller 21, which is to be maintained at a much lower temperature than band 14, may be cooled by means not shown, similar to those describd with reference to the heating of roller 15.

Figure 2:
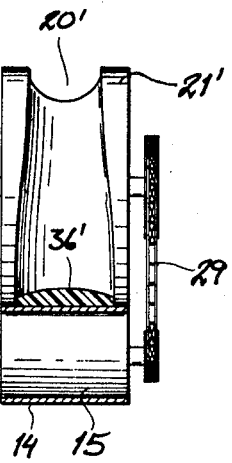
FIGS. 2 and 3 are detail views showing modifications of certain parts of the system of FIG. 1.

FIG. 2 shows the roller 15 and the band 14 juxtaposed with a coacting roller 21' with a peripheral groove of varying width and depth defining a gap 20' for the shaping of a body 36'. Whereas in FIG. 1 the roller 21 has lateral flanges straddling the band 14 to form the gap 20, the flanges of roller 21' in FIG. 2 bear upon the upper surface of the band. If the depth and the width of the peripheral groove of roller 21' vary inversely so that the cross-section of gap 20' remains substantially constant, the band speed need not be changed; otherwise, the same type of speed regulation as described in conjunction with FIG. 1 may be employed.

Figure 3:
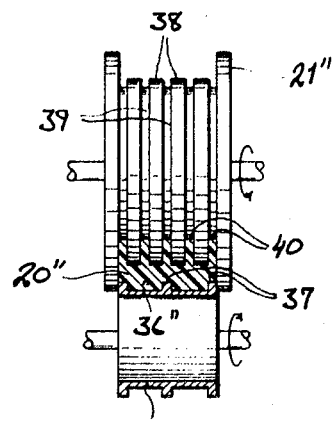

In FIG. 3 the roller 15 is surrounded by a modified steel band 14' having a profiled surface with several ribs 37 of constant height. A coacting roller 21" has a peripheral recess defining a gap 20" for an extruded body 36", this peripheral recess being internally bounded by a corrugated surface constituted by annular ribs 38 and intervening annular grooves 39. The radius of ribs 38 is constant whereas the radius of the bottom grooves 39 varies so that the molded body 36" is formed with upstanding ribs 40 of varying height rising from a substantially rectangular base of constant cross-section. Because of the restricted width of the grooves 39, the ribs 40 are relatively narrow so that the overall cross-sectional area of body 36" changes only slightly even though its overall height varies considerably. If the percentage variation of the cross-sectional area is sufficiently small, the aforedescribed means for the maintenance of a constant density may be dispensed with.

Figure 4:
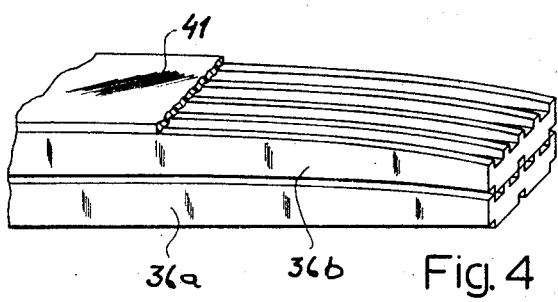
FIG. 4 is a fragmentary perspective view of a composite body produced by a system of the type illustrated in FIG. 3.

Strips such as those produced by the system of FIG. 3 may be stacked and laminated together, e.g., as shown at 36a, 36b in FIG. 4, to form a composite body such as a ski runner. It will be noted that the originaly flat underside of strip 36b has been bent into conformity with the curved profile of the ribs of strip 36a. A bonding agent may be introduced into the spaces left between these ribs; in like manner, a thin cover plate 41 of similar material is shown bonded to the ribbed upper surface of strip 36b. The entire structure may, of course, be further deformed prior to lamination to assume the shape characteristic for a snow runner.

According to the number of superposed strips, the thickness variation of the composite body will be a multiple of that of each individual strip. If, for example, the individual strip thickness varies from a center thickness of 5 mm. to a thickness of 0.5 to 1 mm. at the ends, the overall thickness in the case of four strips will be around 20 mm. and will taper down to approximately 3 to 4 mm. at the extremities.

When ABS is used as the extruded material, the temperature of the heated roller 15 and band 14 (FIG. 1) may range between about 180 and 220° C. while the counterroller 21 is cooled to a temperature of approximately 60–100° C.

What is claimed is:

1. A method of making an elongated strip of thermoplastic material varying over its length in at least one transverse dimension, comprising the steps of continuously extruding said resinous material as a deformable coherent mass into a gap formed between a forwardly moving supporting band and a coacting roller to produce an elongated solid body, gradually and periodically varying the shape of said gap during extrusion to alter the cross-section of said body, maintaining said band at a temperature near the softening point of said material but higher than that of said roller to a sufficient extent to cause adherence of the extruded material to the surface of said band, allowing said material to cool, and stripping the cooled body off said band.

2. A method of making elongated strips of thermoplastic material varying over their length in at least one transverse dimension, comprising the steps of continuously extruding said thermoplastic material as a deformable coherent mass into a gap formed between a forwardly moving supporting band and a coacting roller to produce an elongated solid body, gradually and repetitively varying the shape of said gap during extrusion to alter the cross-section of said body, maintaining said band at a temperature near the softening point of said material but higher than that of said roller to a sufficient extent to cause adherence of the extruded material to the surface of said band, allowing said material to cool, continuously stripping the cooled body off said band, and longitudinally subdividing said body into sections.

3. A method of making an elongated strip of thermoplastic material varying over its length in at least one transverse dimension, comprising the steps of extruding said thermoplastic material as a deformable coherent mass into a gap formed between a forwardly moving supporting band and a coacting roller to produce elongated solid bodies, gradually and periodically varying the shape of said gap during extrusion to alter the cross-sections of said bodies, maintaining said band at a temperature near the softening point of said material but higher than that of said roller to a sufficient extent to cause adherence of the extruded material to the surface of said band, allowing said material to cool, stacking said bodies and laminating the stack bodies together.

4. A method as defined in claim 1, 2 or 3 wherein the shape of said gap is varied by transversely displacing said roller with reference to said band.

5. A method as defined in claim 1, 2 or 3 comprising the further step of compensating for changes in gap width by commensurately changing the speed of said band and roller.

6. A method as defined in claim 1, 2 or 3 wherein said material is subjected to an annealing treatment on said band before being stripped therefrom.

References Cited

UNITED STATES PATENTS

| | | | |
|---|---|---|---|
| 2,437,884 | 3/1948 | Maynard | 264—167 |
| 2,920,352 | 1/1960 | Miller et al. | 264—177 |
| 3,394,429 | 2/1968 | Nakagawa et al. | 264—167 |

JULIUS FROME, Primary Examiner

T. MORRIS, Assistant Examiner

U.S. Cl. X.R.

18—1, 4, 10; 161—137; 264—280, 284